United States Patent [19]

Tsuji et al.

[11] Patent Number: 5,294,986
[45] Date of Patent: Mar. 15, 1994

[54] VIDEO SIGNAL GRADATION CORRECTOR WHICH PREVENTS EXCESSIVE EXTENSION OF THE DYNAMIC RANGE

[75] Inventors: Toshiaki Tsuji, Takatsuki; Atsuhisa Kageyama, Ibaraki, both of Japan

[73] Assignee: Matsushita Electric Industrial Co., Ltd., Osaka, Japan

[21] Appl. No.: 886,927

[22] Filed: May 22, 1992

[30] Foreign Application Priority Data

May 28, 1991 [JP] Japan .................................. 3-123646

[51] Int. Cl.$^5$ .............................................. H04N 5/14
[52] U.S. Cl. .................................... 348/672; 348/674
[58] Field of Search ................ 358/166, 160, 455, 37, 358/167, 163; 382/18; H04N 5/14

[56] References Cited

U.S. PATENT DOCUMENTS 4,695,884 9/1987 Anastassiou et al. ............ 358/166 X

*Primary Examiner*—Victor R. Kostak
*Attorney, Agent, or Firm*—Stevens, Davis, Miller & Mosher

[57] ABSTRACT

A gradation corrector for use in a television receiver which can subject a signal at any luminance level to non-linear correction to provide optimum image quality. Memory stores therein luminance histogram of an input signal. On the basis of the data, a circuit detects a total frequency, a circuit detects luminance distribution, and a circuit detects the expanse of the luminance distribution. A circuit calculates a fixed value to be added. Further, a circuit detects a minimum luminance level, and a circuit detects an average luminance level. A circuit calculates an accumulation starting point and a circuit calculates an accumulation stopping point. An adder adds the calculated fixed value to the data in the memory. A circuit accumulates the results in the range from the accumulation starting point to the accumulation stopping point. The accumulation result is stored in memory. A circuit detects the maximum cumulative value, and a circuit normalizes all the data stored in the memory by use of this maximum value. The normalized data are stored in a memory. Thus, the input signal is subjected to optimum normalization by use of the normalized data.

4 Claims, 5 Drawing Sheets

VIDEO SIGNAL GRADATION CORRECTOR WHICH PREVENTS EXCESSIVE EXTENSION OF THE DYNAMIC RANGE

BACKGROUND OF THE INVENTION

The present invention relates to a gradation corrector used in correcting the gradation of a video signal in a television receiver, a video tape recorder, a video camera, a video disk or the like.

In recent years, great importance has been attached to gradation correctors in order to provide more clearer images which are required with the increase in size of color television receivers and the improvement in image quality thereof, and more especially, in order to expand the dynamic range of an image on a CRT by passing a video signal through a non-linear amplifier to correct the gradation of the video signal. A U.S. patent application Ser. No. 838,844 entitled "Gradation corrector" was filed on Feb. 21, 1992 (on basis of Japanese patent application No. 3-32794 filed on Feb. 2, 1991). A U.S. patent application Ser. No. 846,143 entitled "Video signal gradation corrector" was filed on Mar. 5, 1992 (on basis of Japanese patent application No. 3-58657 filed on Mar. 22, 1991). A new U.S. patent application entitled "Video signal gradation corrector" is filed on basis of Japanese patent application Nos. 3-123647 and 3-123468 filed on May 28, 1991. These three patent application have been assigned to the same assignee with the present application.

An explanation will be given of a gradation corrector proposed precedently to the present application.

FIG. 3 is a block diagram of the preceding gradation corrector. In FIG. 3, reference numeral 1 designates a black detection circuit for detecting a signal corresponding to a black portion in an input luminance signal to output a black detection signal. Numeral 2 designates a gain control circuit for gain-controlling the black detection signal in accordance with a gain control signal to output an amplified black detection signal. Numeral 3 designates an adder for adding the input luminance signal to the amplified luminance signal to output an output luminance signal. Numeral 4 designates a black peak-hold circuit for holding the black peak level of the output luminance signal to output the voltage with the level as a black peak hold voltage. Numeral 5 designates a comparator for comparing the black peak-hold voltage with a reference voltage. Numeral 6 designates a voltage source for generating the reference voltage.

The operation of the gradation corrector thus constructed will be explained with reference to FIG. 4. FIG. 4 shows waveforms of signals at several points of the gradation corrector of FIG. 3.

First, an input luminance signal a is inputted to the black detection circuit which extracts the black signal corresponding to the portion lower than a predetermined value of the luminance signal to be outputted as a black detection signal b. The black detection signal b is inputted to the gain control circuit 2 which controls its gain in accordance with a gain control voltage f to output an amplified black detection signal c. The signal c is inputted to the adder 3 which adds it to the input luminance signal a to output an output luminance signal d with an extended dynamic range on the black side. The signal d is outputted externally and also inputted to the black peak-hold circuit 4. The peak-hold circuit 4 detects the highest black luminance signal level to output the voltage with the level as a black peak-hold voltage e. The comparator 5 compares the peak-hold voltage e with a reference voltage r generated by the voltage source 6 to feed back a difference between them as a gain control voltage f to the gain control circuit 2. This feed-back system is stabilized when the black peak voltage e becomes equal to the reference voltage g. In this way, when there is a black-detection component, if the corresponding peak voltage is controlled to always be equal to the reference voltage, the dynamic range is extended on the black side to provide gradation correction.

FIG. 5 is a block diagram of another precedent gradation corrector. Reference numeral 7 designates an A/D converter for converting an input luminance signal into a digital value. Numeral 8 designates a histogram memory for obtaining a luminance histogram of the input luminance signal. In general, the luminance level enters an address of the memory 2 and the frequency enters as the data thereof. Numeral 9 designates a histogram accumulation circuit for accumulating the output signals from the histogram memory 8. Numeral 10 designates a cumulative histogram memory for storing therein the result of accumulation by the histogram accumulation circuit 9. In general, the luminance level enters an address of the memory 9 and the frequency enters as data thereof. Numeral 11 designates a look-up table operating circuit which normalizes the respective data from the cumulative histogram memory 10 so that the maximum value resulting from accumulation becomes the maximum value of the output luminance signal. Numeral 12 designates a look-up table memory for storing therein the output signal normalized by the look-up table operating circuit 11. In general, the input luminance level enters an address of the memory 12 and the frequency enters as the data thereof. Numeral 13 designates a D/A converter which converts an output luminance signal in digital value corrected by the look-up table memory 12 into an analog signal. Numeral 14 designates a timing control circuit 14 which makes sequencing of various operations and control for the memories.

The operation of the gradation corrector circuit thus constructed will be explained below. FIG. 6 shows the manner of conversion in the circuit.

First, an input luminance signal a is inputted to the A/D converter 7 which converts it into a digital value to be outputted as a converted input luminance signal h. The histogram memory 8 takes the converted input luminance signal h as an address and adds 1 to the data at the address for each access. By performing this operation during one vertical scanning period, it is possible to detect a histogram distribution of the input luminance signal a. The histogram distribution is shown in FIG. 6(A). The contents of the histogram memory 8 are cleared at every predetermined period to make all the data zero. Usually, this period is set for one vertical scanning period or its integer-times.

Next, data of the histogram memory 8 are read sequentially from the address of 0 by the histogram accumulation circuit 9 which in turn the output signals i. The accumulation result j is stored in the cumulative histogram memory 10. It is shown in FIG. 6(B).

The look-up table operating circuit 11 determines a normalization coefficient so that the maximum value of the cumulative histogram memory 10 is the maximum output luminance level. The look-up table operating circuit 11 performs a normalization operation on all the data in the cumulative histogram memory 10 by use of the determined normalization coefficient. The operation result is stored in the look-up table memory 12. It is shown in FIG. 6(C).

Data in the look-up table memory 12 is read with a converted input luminance signal h as an address and the read data is outputted as a corrected output luminance signal as a corrected output luminance signal m. FIG. 6(D) shows a histogram of the corrected luminance signal m. The D/A converter converts the corrected output luminance signal m into an analog signal d to be outputted.

The timing control circuit 14 controls the operations of various circuits so that the respective parts are performed in the order as described above.

The above precedent correctors have the following defects. The first corrector has a problem that since only a black signal is subjected to gradation correction, a high luminance level signal or an intermediate luminance level signal is not gradation-corrected, and so the dynamic range cannot be improved sufficiently.

The second corrector which is directed to "histogram flattening processing" can extend the dynamic range to 100%. But a normal video signal when subjected to such processing results in quite unlike an actual image.

SUMMARY OF THE INVENTION

The present invention intends to solve the above problems involved with the precedent correctors.

An object of the present invention is to provide a gradation corrector which subjects a high luminance level signal or an intermediate level signal as well as a black side signal to sufficient gradation correction and prevents excessive extension of the dynamic range so that the gradation correction can be realized with high fidelity and contrast.

The present invention performs the following operation in accordance with the construction described above. The limiter circuit limits the upper limit of the frequency of an extracted luminance histogram to a predetermined value. Thereafter, the total frequency detection circuit detects the total frequency of a luminance histogram. Further, the luminance distribution detection circuit detects the luminance distribution of the luminance histogram. On the basis of these results, the dispersion coefficient calculating circuit calculates the degree of expanse of the luminance histogram and the adding value calculating circuit a certain value to be added when a cumulative histogram is acquired. The adder adds the adding value to the output signal from the histogram memory. The histogram accumulation circuit accumulates the adding results. The cumulative histogram memory stores the accumulation results. In this case, it should be noted that the accumulation is carried out within a range from a starting point detected by the accumulation starting luminance level calculating circuit to a stopping point detected by the accumulation stopping luminance level calculating circuit. The accumulation stopping point is calculated on the basis of the average luminance level of the input video signal detected by the average luminance level detecting circuit. The accumulation starting point is calculated on the basis of the minimum level of the luminance histogram detected by the minimum value detecting circuit, the above average level and dispersion coefficient.

On the basis of maximum value of the cumulative histogram detected by the maximum cumulative value detecting circuit, the look-up table operating circuit normalizes the respective data of the cumulative histogram. The operating result is stored in the look-up table memory. The input video signal is converted on the normalized data.

Thus, the luminance histogram of the input video signal is detected by use of the histogram memory to perform histogram flattening processing usually performed. In this case, with the feature of the high dynamic range maintained, the processing optimum to the video signal can be carried out.

DESCRIPTION OF THE PREFERRED EMBODIMENT

Figure 1:
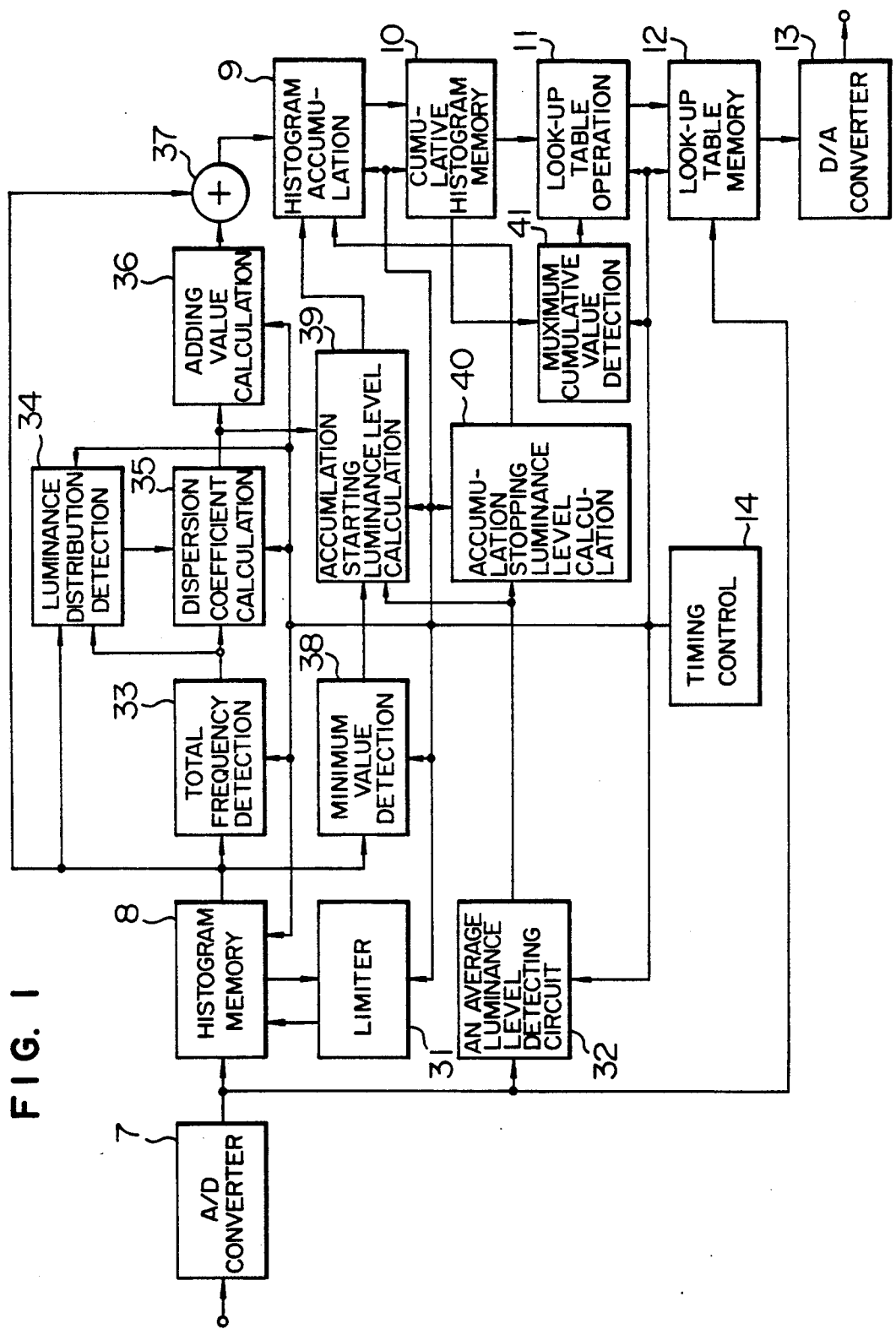
FIG. 1 is a block diagram of the gradation corrector according to an embodiment of the present invention.

Now referring to the drawings, an explanation will be given of one embodiment of the present invention.

FIG. 1 is a block diagram of the gradation corrector according to the present invention. In FIG. 1, reference numeral 7 designates an A/D converter; 8 a histogram memory; 9 a histogram accumulation circuit; 10 a cumulative histogram memory; 11 a look-up table operating circuit; 12 a look-up table memory; 13 a D/A converter. These components are the same as the corresponding components in the second prior art. Numeral 31 designates a limiter circuit which limits the frequency of luminance histogram so that it does not exceed a certain value. Numeral 32 designates an average luminance level detecting circuit which detects the average luminance level of an input video signal. Numeral 33 designates a total frequency detecting circuit which detects the total frequency of the luminance histogram processed. Numeral 34 designates a luminance distribution detecting circuit which detects the expanse of luminance distribution. Numeral 35 designates a dispersion coefficient calculating circuit which calculates the expanse of the luminance histogram. Numeral 36 designates an adding value calculating circuit which calculates a certain value to be added when a cumulative histogram is acquired. Numeral 37 designates an adder which adds the output signal from the histogram memory 8 to that from the adding value calculating circuit 36. Numeral 38 designates a minimum value detecting circuit which detects the minimum level of the luminance histogram. Numeral 39 designates an accumulation starting luminance level calculating circuit which calculates the starting luminance level in the cumulative histogram operation. Numeral 40 designates an accumulation stopping luminance level calculating circuit which calculates the stopping luminance level in the cumulative histogram operation. Numeral 41 designates a maximum cumulative value detecting circuit which detects the maximum value of the cumulative histogram. Numeral 14 designates a timing control circuit which controls the operation order of the above circuits and the memories.

The operation of the gradation corrector thus constructed will be explained.

Figure 2A:
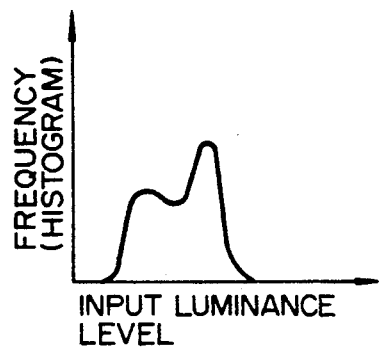
FIGS. 2a-f are waveforms for explaining the operation of the gradation corrector according to the present invention.
Figure 2E:
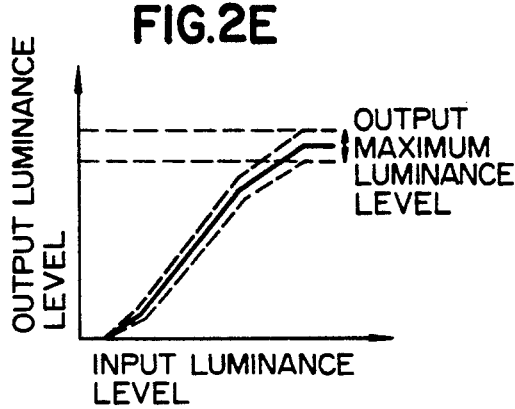
Figure 2B:
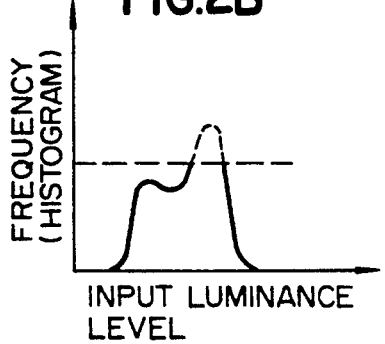

First, the luminance histogram of an input video signal is stored in the histogram memory 8. This is shown in FIG. 2(A). With a certain upper limit given for the frequency of the luminance histogram, the limiter circuit 31 limits the frequency within the upper limit level. This is shown in FIG. 2(B). Thereafter, on the basis of the luminance histogram thus processed, respective operations will be performed.

First, the total frequency detecting circuit 33 detects the area of the luminance histogram, i.e., the total of the respective frequencies. The luminance distribution detecting circuit acquires the frequencies corresponding to 10% and 90% of the detected total frequency, and on the basis of the data from the histogram memory 8, detects the luminance level range in which the frequencies from 10% to 90% are included. The dispersion coefficient calculating circuit 35 calculates the expanse of the luminance histogram on the detected total frequency and luminance distribution. The adding value calculating circuit 36 calculates a certain value to be added when a cumulative histogram is acquired from the calculated dispersion coefficient (see FIG. 2(C)). The adding value influences the correction effect in such a way that the larger the adding value, the weaker the correction effect whereas the smaller the adding value, the stronger is the correction effect. The adder 37 adds the output signal from the histogram memory 8 to that from the adding value calculating circuit 36.

The minimum value detecting circuit 38 detects the minimum luminance level of the luminance histogram on the basis of the output signal from the histogram memory 8. The average luminance level detecting circuit 32 detects the average level of the input video luminance signal. On the basis of the detected minimum luminance level and average luminance level and the above dispersion coefficient, the accumulation starting luminance level calculating circuit 39 calculates the luminance level where accumulation should be started when the cumulative histogram is to be acquired. On the basis of the detected average luminance, the accumulation stopping luminance level calculating circuit 40 calculates the luminance level where accumulation should be stopped when the cumulative histogram is to be acquired.

Figure 2F:
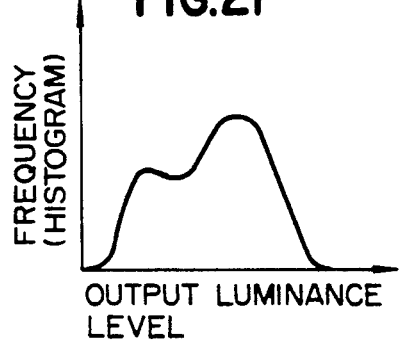
Figure 2C:
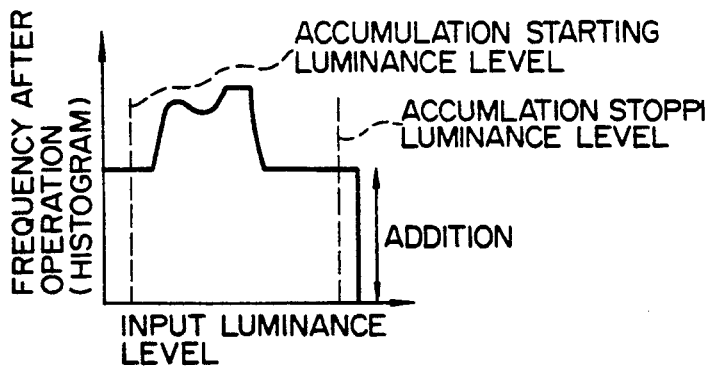
Figure 2D:
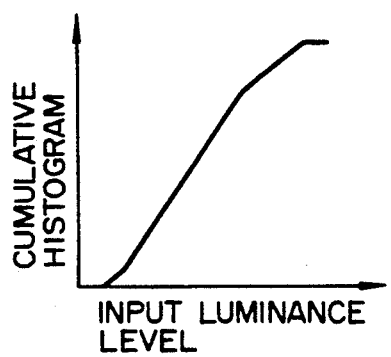
Figure 3:
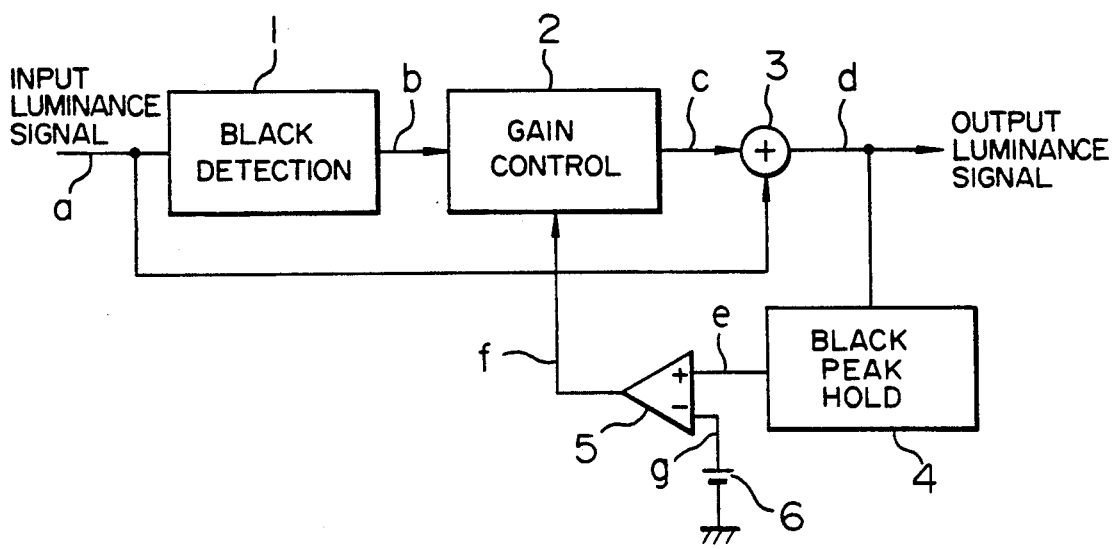
FIG. 3 is a block diagram of a gradation corrector proposed precedently to the present application.
Figure 4:
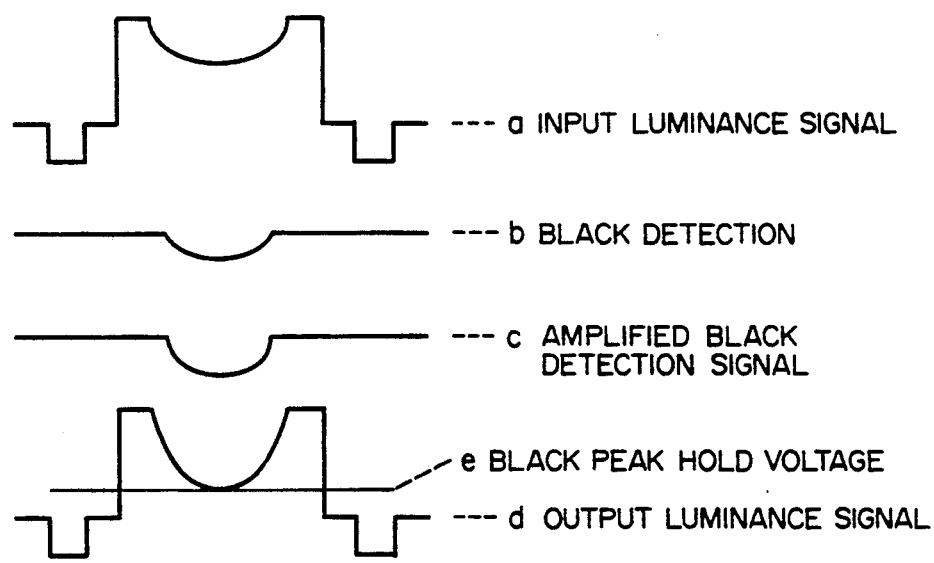
FIG. 4 are waveforms for explaining the operation of the gradation corrector of FIG. 3.
Figure 5:
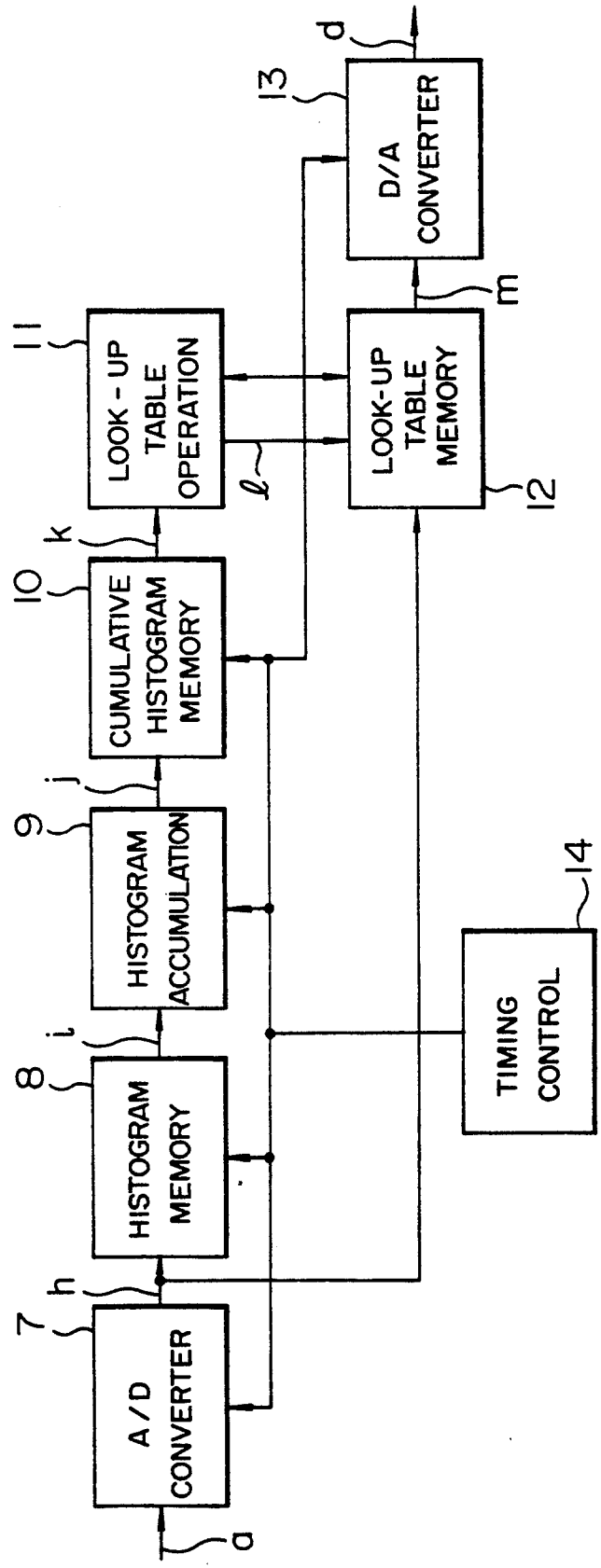
FIG. 5 is a block diagram of another gradation corrector proposed precedently to the present application.
Figure 6A:
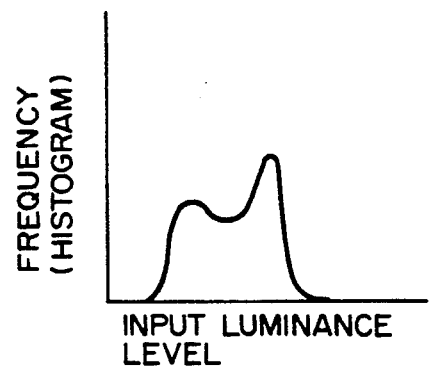
FIG. 6a-d are waveforms for explaining the operation of the gradation corrector of FIG. 5.
Figure 6B:
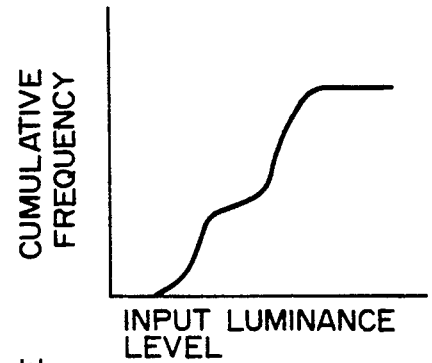
Figure 6C:
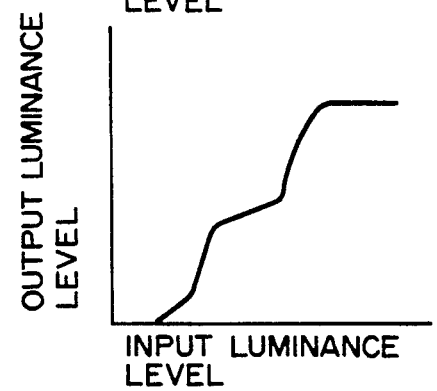
Figure 6D:
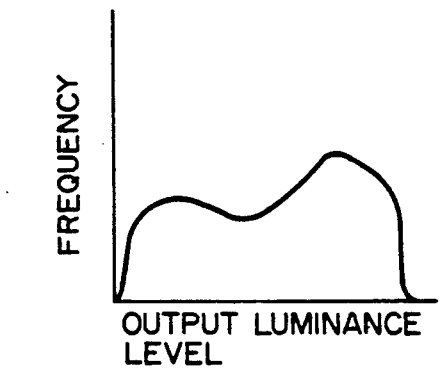

The histogram accumulating circuit 9 accumulates the output signals within a range from the luminance level calculated by the accumulation starting luminance level calculating circuit to that calculated by the accumulation stopping luminance level calculating circuit 40, and stores the accumulation result in the cumulative histogram memory 10. The accumulation result is shown in FIG. 2(D). The maximum cumulative value detecting circuit 41 detects a maximum cumulative value on the basis of data stored in the cumulative histogram memory 10. The look-up table operating circuit 11 calculates a normalization coefficient so that the detected maximum value is the maximum value of a corrected output luminance level, and normalizes the respective data stored in the cumulative histogram memory using this coefficient. The normalization result is shown in FIG. 2(E). The operating result is stored in the look-up table memory 12 to complete the setting for gradation correction. The corrected output luminance signal is obtained on the basis of the data at an address of the input luminance signal in the look-up table memory 12. The histogram with the luminance converted is shown in FIG. 2(F).

As described above, in accordance with this embodiment, provided are the histogram memory 8, the histogram accumulation circuit 9, the cumulative histogram memory 10, the look-up table operating circuit 11, the look-up table memory 12, the timing control circuit 14, the limiter circuit 31, the average level detecting circuit 32, the total frequency detecting circuit 33, the luminance distribution detecting circuit 34, the dispersion coefficient calculating circuit 35, the adding value calculating circuit 36, the adder 37, the minimum value detecting circuit 38, the accumulation starting luminance level calculating circuit 39, the accumulation stopping luminance level calculating circuit 40 and the maximum cumulative value detecting circuit 41. By use of such an arrangement, the histogram flattening processing can be applied to the gradation correction for a video signal such as a television signal. Further, since the correction effect is controlled by the constant adding value, accumulation starting luminance level and accumulation stopping luminance level which are detected from the luminance histogram, unlike the prior art, a high luminance level signal or an intermediate level signal as well as a black side signal is subjected to sufficient gradation correction and excessive extension of the dynamic range is prevented so that the gradation correction can be realized with high fidelity and contrast.

Accordingly, in the arrangement composed of a histogram memory, a limiter circuit, the histogram accumulation circuit, a total frequency detecting circuit, a luminance distribution detecting circuit, a dispersion coefficient calculating circuit, an adding value calculating circuit, an adder, a minimum value detecting circuit, an average luminance detecting circuit, an accumulation starting luminance level calculating circuit, an accumulation stopping luminance level calculating circuit, a histogram accumulation circuit, a histogram memory, a maximum cumulative value detecting circuit, a look-up table operating circuit, a look-up table memory and a timing circuit, the present invention can provide a gradation corrector which subjects a high luminance level signal or an intermediate level signal as well as a black side signal to sufficient gradation correction and prevents excessive extension of the dynamic range so that the gradation correction can be realized with high fidelity and contrast.

We claim:
1. A gradation corrector comprising:
a histogram memory device for storing the luminance histogram of a video luminance signal;
a limiter circuit, connected with said histogram memory, for limiting the data supplied from said histogram memory in accordance with a threshold level;
a total frequency detecting circuit for detecting the total frequency of the luminance histogram on the basis of the output signal from said histogram memory;
a luminance distribution detecting circuit for detecting the luminance distribution of said luminance histogram on the basis of the output signal from said total frequency detecting circuit and that from said histogram memory;

a dispersion coefficient calculating circuit for calculating the expanse of said luminance histogram on the basis of the output signal from said luminance distribution detecting circuit and that from said total frequency detecting circuit;

an adding value calculating circuit for calculating a fixed value to be added when a cumulative histogram is acquired on the basis of the calculation result supplied from said dispersion coefficient calculating circuit;

an adder for adding the calculation result from said adding value calculating circuit to the output signal from said histogram memory;

a minimum value detecting circuit for detecting the minimum luminance level of said luminance histogram on the basis of the output signal from said histogram memory;

an average luminance level detecting circuit for detecting the average luminance level of the video signal inputted to said histogram memory;

an accumulation starting luminance level calculating circuit for calculating the luminance level where accumulation should be started when the cumulative histogram is to be acquired, on the basis of the output signals from said average luminance level detecting circuit, said minimum value detecting circuit and said dispersion coefficient calculating circuit;

an accumulation stopping luminance level calculating circuit for calculating the luminance level where accumulation should be started when the cumulative histogram is to be acquired, on the basis of the output signal from said average luminance level detecting circuit;

a histogram accumulation circuit for accumulating the outputs from said adder while they are controlled by the output signals from said accumulation starting luminance level calculating circuit and said accumulation stopping luminance level calculating circuit;

a cumulative histogram memory device for storing the accumulation result;

a maximum cumulative value detecting circuit for detecting the maximum value of the cumulative histogram on the basis of the output signal from said cumulative histogram memory;

a look-up table operating circuit for normalizing the output signal from said cumulative histogram memory on the basis of the output signal from said maximum cumulative value detecting circuit;

a look-up table memory device for storing the operation result in said look-up table operating circuit to convert the inputted video luminance signal on the basis of the corresponding data and outputting the converted signal; and a timing control circuit for controlling the operation of each of said circuits.

2. A gradation corrector according to claim 1, wherein said limiter circuit limits the data supplied from said histogram to an upper limit value.

3. A gradation corrector according to claim 1, wherein said limiter circuit limits a frequency of the data supplied from said histogram circuit.

4. A gradation corrector according to claim 3, wherein said limiter circuit limits said frequency of the data supplied from said histogram circuit to an upper value.

* * * * *